(12) United States Patent
Frampton et al.

(10) Patent No.: US 11,242,044 B2
(45) Date of Patent: Feb. 8, 2022

(54) MOTOR GENERATOR CONTROL FOR FIXED FUEL SOURCE ENGINE

(71) Applicant: Kohler Co., Kohler, WI (US)

(72) Inventors: Isaac S. Frampton, Strattanville, PA (US); Adam Larson, Mequon, WI (US)

(73) Assignee: Kohler Co., Kohler, WI (US)

( * ) Notice: Subject to any disclaimer, the term of this patent is extended or adjusted under 35 U.S.C. 154(b) by 381 days.

(21) Appl. No.: 16/038,867

(22) Filed: Jul. 18, 2018

(65) Prior Publication Data

US 2020/0023832 A1 Jan. 23, 2020

(51) Int. Cl.
*B60W 20/15* (2016.01)
*B60W 10/06* (2006.01)
*B60W 10/08* (2006.01)
*F02D 41/00* (2006.01)
*F02D 19/02* (2006.01)
(Continued)

(52) U.S. Cl.
CPC ............ *B60W 20/15* (2016.01); *B60W 10/06* (2013.01); *B60W 10/08* (2013.01); *F02D 19/021* (2013.01); *F02D 29/06* (2013.01); *F02D 41/0027* (2013.01); *F02M 21/0215* (2013.01);
(Continued)

(58) Field of Classification Search
CPC ...... B60W 20/15; B60W 10/06; B60W 10/08; B60W 10/26; B60L 15/2045; F02D 41/0027; F02D 19/021; F02D 29/06; F02D 2250/24; F02M 21/0215
See application file for complete search history.

(56) References Cited

U.S. PATENT DOCUMENTS 5,563,802 A 10/1996 Plahn et al.
6,311,650 B1 * 11/2001 Lamm ................ H01M 8/0625
123/3

(Continued)

FOREIGN PATENT DOCUMENTS

CN 203312805 U 11/2013
GB 2069260 B 8/1984
WO WO2017041752 A1 3/2017

OTHER PUBLICATIONS

"Hybrid Power Solutions for Telecom." Telecom Hybrid—Neopower. Accessed Apr. 2, 2018. http://www.neopower-ng.com/category/telecom-hybrid.

*Primary Examiner* — Phutthiwat Wongwian
*Assistant Examiner* — Susan E Scharpf
(74) *Attorney, Agent, or Firm* — Lempia Summerfield Katz LLC

(57) ABSTRACT

A system for supplementing a fixed fuel source for an engine includes a motor-generator set connected to a mechanical load device and a controller. The motor-generator set includes a motor and a generator. The engine is configured to provide a first torque from a fixed fuel source from an independent variable flow input. The fixed fuel source is independent of the engine and set external to the engine. The mechanical load device is driven by the engine and configured to require a second torque defined by an independent flow device. The controller is configured to compare the first torque and the second torque, provide a first control signal to the motor to provide power to the engine when the second torque exceeds the first torque and provide a second control signal to the generator to draw power from the engine when the first torque exceeds the second torque.

9 Claims, 11 Drawing Sheets

(51) Int. Cl.
*F02D 29/06* (2006.01)
*F02M 21/02* (2006.01)
*B60L 15/20* (2006.01)
*B60W 10/26* (2006.01)

(52) U.S. Cl.
CPC .......... *B60L 15/2045* (2013.01); *B60W 10/26* (2013.01); *F02D 2250/24* (2013.01); *Y02T 10/30* (2013.01)

(56) References Cited

U.S. PATENT DOCUMENTS

| | | | |
|---|---|---|---|
| 6,360,835 B1* | 3/2002 | Skala | H01M 8/04029 180/65.22 |
| 6,800,390 B2* | 10/2004 | Kashiwagi | H01M 8/2457 429/415 |
| 6,858,340 B2* | 2/2005 | Sugawara | F04F 5/461 429/443 |
| 7,174,714 B2* | 2/2007 | Algrain | F02D 23/00 290/40 A |
| 7,279,242 B2* | 10/2007 | Sugawara | H01M 8/04097 429/415 |
| 7,718,289 B2* | 5/2010 | Asai | H01M 8/04156 429/408 |
| 8,051,637 B2* | 11/2011 | Labrador | F03G 7/00 60/39.01 |
| 8,544,575 B1 | 10/2013 | Scaringe et al. | |
| 9,243,527 B2* | 1/2016 | Bidner | F01M 13/02 |
| 2001/0052433 A1* | 12/2001 | Harris | B60K 6/405 180/68.5 |
| 2002/0022171 A1* | 2/2002 | Saito | H01M 8/04097 429/443 |
| 2002/0142197 A1* | 10/2002 | Kato | H01M 8/04228 429/429 |
| 2004/0155526 A1 | 8/2004 | Naden et al. | |
| 2005/0230976 A1 | 10/2005 | Yang | |
| 2007/0037661 A1 | 2/2007 | Yang | |
| 2008/0022686 A1* | 1/2008 | Amdall | B60W 10/08 60/716 |
| 2008/0243324 A1* | 10/2008 | Harris | B60W 30/19 701/22 |
| 2009/0048745 A1* | 2/2009 | Wu | B60W 20/00 701/51 |
| 2011/0033763 A1* | 2/2011 | Adcock | H01M 8/0441 429/429 |
| 2011/0080040 A1 | 4/2011 | Kumar | |
| 2011/0212012 A1* | 9/2011 | McAlister | F24S 20/20 423/358 |
| 2013/0047607 A1* | 2/2013 | Petrovic | F02D 21/08 60/605.2 |
| 2013/0172636 A1* | 7/2013 | McAlister | B01J 6/008 585/240 |
| 2014/0148984 A1 | 5/2014 | Nishi et al. | |
| 2014/0261288 A1* | 9/2014 | Coney | F02G 5/02 123/197.1 |
| 2014/0339000 A1* | 11/2014 | Bidner | B60K 6/48 180/69.5 |
| 2015/0059719 A1* | 3/2015 | Bidner | F01M 13/02 123/574 |
| 2018/0045109 A1* | 2/2018 | Fortini | F02M 26/00 |

* cited by examiner

ROTOR ASSEMBLY

MOTOR GENERATOR CONTROL FOR FIXED FUEL SOURCE ENGINE

FIELD

This application relates to the fields of engines, generators, and fixed fuel sources, and more specifically, external fuel sources provided independent to the load on the engine.

BACKGROUND

An engine combusts fuel to convert energy stored in the fuel to mechanical energy. The fuel is mixed with air to create a combustible mix. A throttle controls the air flow rate into the engine. The throttle may include a valve between the air intake filter of the engine and the manifold of the engine. As more air is provided to the engine, more fuel is mixed with the air to provide a consistent air-fuel ratio, and the engine provides more power.

Typically, the fuel is provided to the engine as needed. That is, the throttle regulates the amount of air and thus, by ratio, fuel entering the engine according to the demands placed on the engine or operation by the user. However, in some instances, the engine may be supplied with a source of fuel that cannot be regulated. The fuel is supplied to the engine by another source and the engine must combust all of the supplied fuel.

In order to combust all the supplied fuel, the engine power output must vary independently of the speed characteristics of the engine. One mechanism to accomplish this involves operating the engine in synchronous operation with a power grid, setting the speed of the engine and allowing for variable power. Challenges remain in operation of an engine under a fixed fuel source.

BRIEF DESCRIPTION OF THE DRAWINGS

Exemplary embodiments are described herein with reference to the following drawings.

DETAILED DESCRIPTION

Figure 1:
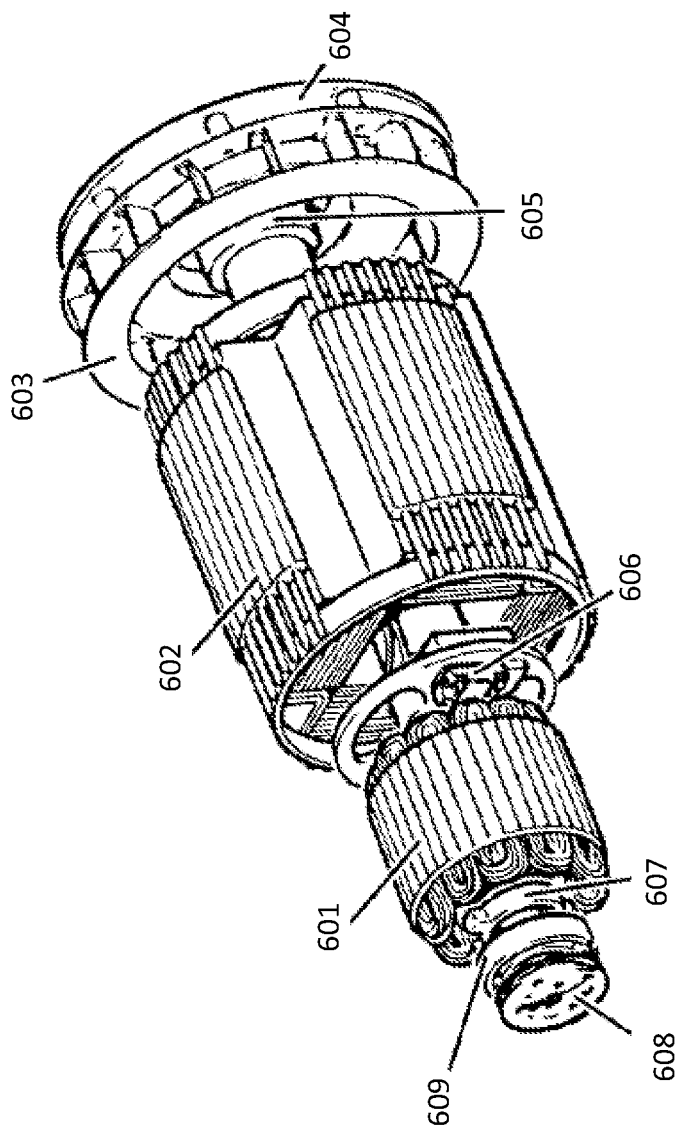
FIG. 1 illustrates an example rotor assembly of a motor-generator.

An internal combustion engine including one or more cylinders shaped to receive the one or more pistons. The one or more pistons may be guided through the one or more cylinders by a connecting rod that is connected to a crankshaft by a crankpin. A combustion chamber includes a combustion chamber adjacent to a head of the piston. The combustion chamber is formed in a cylinder head. The combustion chamber may be connected to the muffler through an exhaust port. In one phase of a combustion cycle for the piston, the exhaust port is blocked from the combustion chamber by the piston, and in a subsequent phase, the exhaust port is in gaseous connection with the combustion chamber to release exhaust gas through the exhaust port. In addition, the power output from the crankshaft of the engine may be used to operate some supporting accessory or functional element of the fuel generation device. The accessory that may require operation at one or more than one asynchronous speed, such as a pump, compressor, fan, propeller, drive wheel, or other variable-speed devices. A fuel generation device may also provide output power in a different form than the mechanical power output from the engine crankshaft. The fuel generation device may also provide power in a similar or identical form to the power produced by the engine crankshaft.

The fuel generation device may also provide fuel to the engine. The fuel generation device together with the engine may form a regenerative cycle. In the regenerative cycle, the fuel generation device provides stored energy to the engine in the form of fuel. Likewise, the engine receives stored energy from the fuel generation device. The energy transfer in the direction of from the engine to the fuel generation device may occur at a different time that the transfer in the direction from the fuel generation device to the engine. The regenerative cycle improves the efficiency of the system.

The regenerative cycle also places limitations on the system. Because the amount of fuel that must be burned by the engine is set by the fuel generation device, the engine has less flexibility in setting the throttle to provide a target output speed or load. In other words, the control of the engine for one or more loads connected to the engine is limited by the operation of the fuel generation device. Sometimes there may be more fuel from the fuel generation device than is needed to adequately provide the load. Sometimes there may be less fuel from the fuel generation device than is needed to adequately provide the load. In some cases, the target output speed may be dependent on a control variable or parameter of the fuel generation device.

The following embodiments provide a motor-generator that cooperates with the engine to act as a generator to receive power from the engine and act as a motor to provide power to the engine. When there is more fuel provided to the engine from the fuel generation device than is needed to adequately provide the load, the motor-generator acts as a generator to generate additional electrical power or mechanical power. When there is less fuel provided to the engine from the fuel generation device than is needed to adequately provide the load, the motor-generator acts a motor driven from another source of power, such as battery bank, a power grid, or a secondary energy output of the fuel generation device to provide mechanical power to the engine.

FIG. 1 illustrates an example rotor assembly 600 for a motor-generator. The rotor assembly 600 may include an exciter armature 601, a field coil assembly 602, a cooling fan 603, drive discs 604, a coupling 605, a rotor controller 606, a sensor 607, a rotor communication device 608, and a rotor bearing 609. Additional, different, or fewer components may be included.

Figure 3:
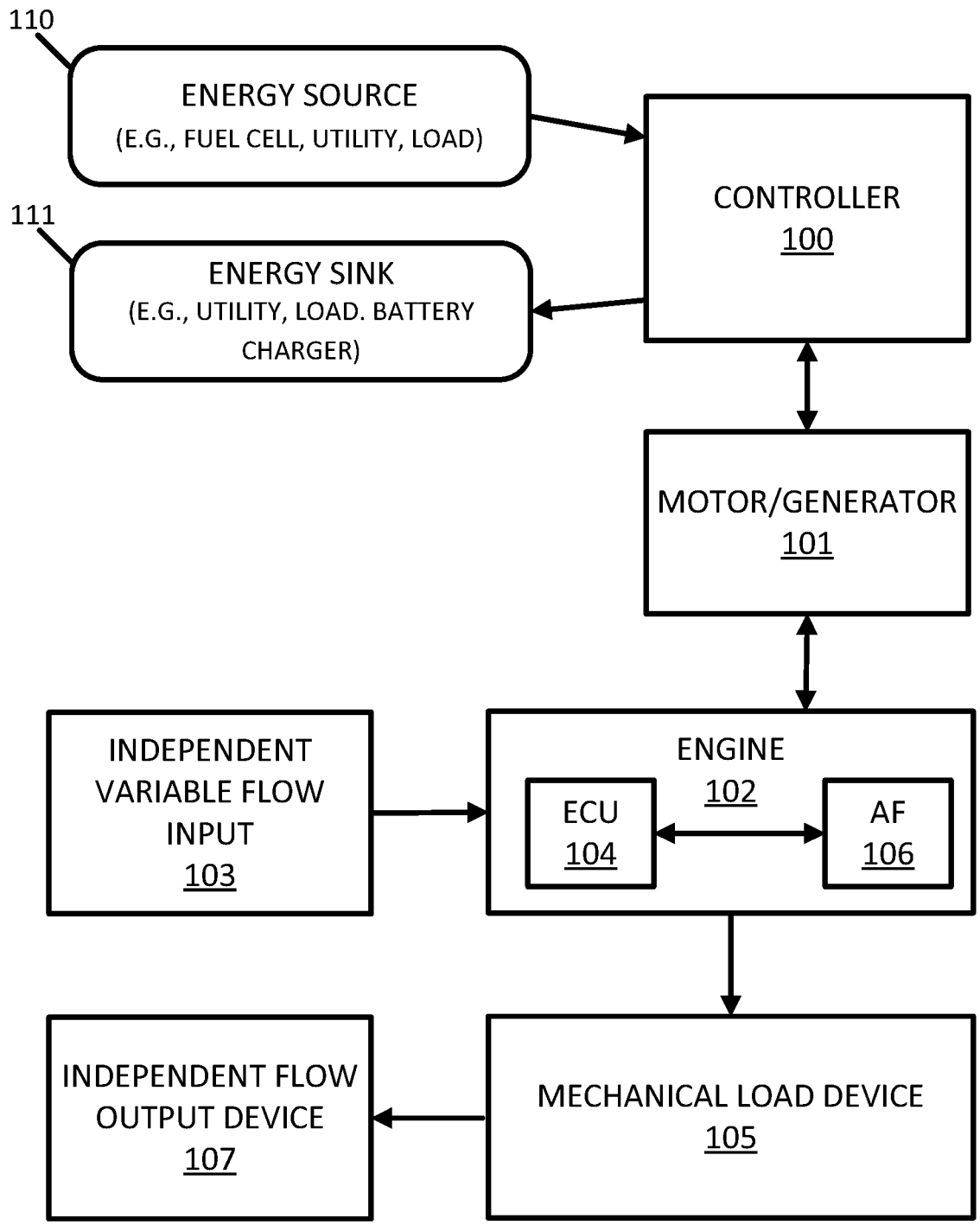
FIG. 3 illustrates an example control system for a fixed fuel source engine supplemented by a generator.

The coupling 605 and/or drive discs 604 couple the rotor assembly 600 to a prime mover such as an engine (e.g., engine 102 in FIG. 3). The coupling 605 is a connection between the rotor assembly 600 and the engine via drive discs 604. The connection may allow power to be transferred in either direction, from the engine to the rotor assembly 600 as a generator, and alternatively from the rotor assembly 600 to the engine as a motor.

When the motor-generator acts as a generator, the engine provides positive torque to the rotor assembly 600, including the field coil assembly 602 and the exciter armature 601, through the drive disks 604. The positive torque provided by the engine is converted to electrical energy by the motor-generator and provided to a load or energy storage device. The engine may also turn the cooling fan 603. The cooling fan 603 forces air across the field coil assembly 602, the rotor controller 606, and/or the exciter armature 601, any of which may expel heat generated by current flowing through the windings or other electrical components. Additional accessories may also be driven by the engine, attached to the engine directly or to the motor-generator rotor assembly 600.

When the motor-generator acts as a motor, the motor-generator provides positive torque to the rotor assembly 600, including the field coil assembly 602 and the exciter armature 601, and to the rotating portion of the engine (e.g. a crankshaft) through the drive disks 604. Additional driven accessories that require operation at a target speed may also be connected to the rotating combination of the engine crankshaft and the rotor assembly 600.

Figure 2:
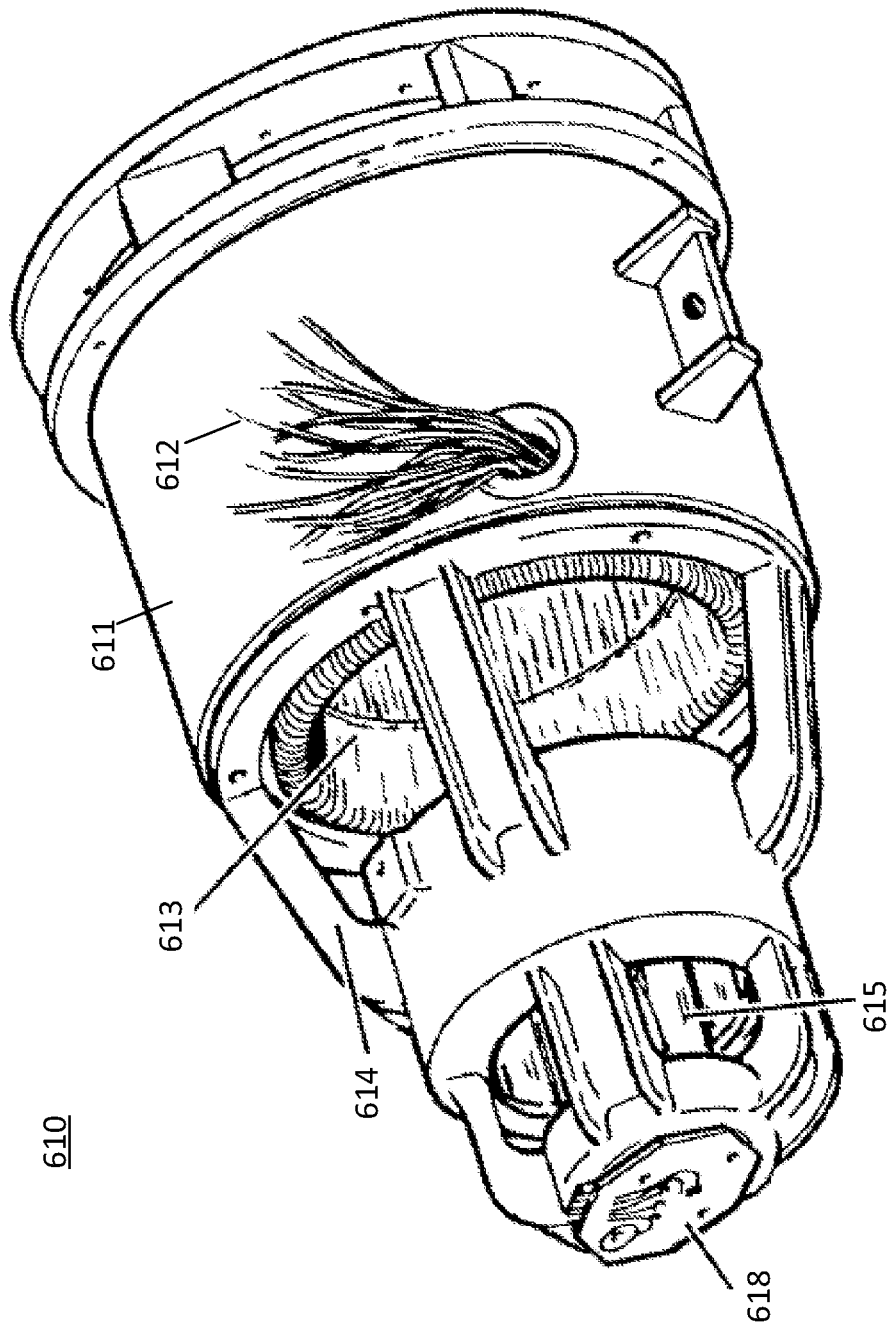
FIG. 2 illustrates an example stator assembly of the motor-generator.

FIG. 2 illustrates an example stator assembly 610. The stator assembly 610 includes a stator chassis 611, a set of leads 612, armature windings 613, an end bracket 614, an exciter field assembly 615, and a stator communication device 618. Additional, different, or fewer components may be included. The rotor assembly 600 fits inside the stator assembly 610. The exciter field assembly 615 is aligned with the exciter armature 601. The stator chassis 611 is aligned with the field coil assembly 602.

The exciter armature 601 includes exciter armature windings, and the exciter field assembly 615 includes a source of magnetic flux, such as either permanent magnets or windings. As the exciter armature windings rotate within the exciter field assembly 615, one or more currents are generated in the exciter armature windings. Two or more wires or other electrically conductive connections connect the exciter armature windings to the field coil assembly 602. The current from the exciter armature windings supplies current to the field coil assembly 602. The current from the exciter armature windings may be switched by a control device (e.g., rotor controller 606) or may be converted to direct current through a semiconductor device, such as a diode.

When the motor-generator acts as a generator, as the field coil assembly 602 rotates within the stator assembly 610, currents are generated in the armature windings 613. The current from the armature windings 613 is carried by the leads 612 to a load. The load may be a battery, a battery bank, a utility grid or another sink such as a heating element or other loads described herein.

When the motor-generator acts as a motor, currents are provided to the armature windings 613 from an electrical power source. The electrical power source may include a battery, a battery bank, a utility grid or another source as described herein. The currents in the armature windings 613 cause the rotor assembly 600 to rotate under the force of the induced magnetic field.

FIG. 3 illustrates an example control system for a fixed fuel source engine supplemented by a motor-generator. The control system includes a controller 100, a motor-generator 101, an engine 102, an independent variable flow input 103, a mechanical load device 105, and an independent flow output device 107. Additional, different, or fewer components may be included.

The motor-generator 101 may include the rotor assembly 600 and the stator assembly 610 illustrated in FIGS. 1 and 2 or a rotor and stator of different construction, containing similar components. The motor-generator 101 is configured to provide power to the engine 102 in some circumstances and draw power from the engine in other circumstances. The power provided to the engine 102 may be provided mechanically through a physical connection of the motor-generator 101 to the engine 102. The power drawn from the engine 102 may be provided mechanically through the physical connection of the motor-generator 101 to the engine 102.

The engine 102 may be an internal combustion engine including one or more cylinders that receive one or more pistons to provide a combustion chamber. The engine 102 burns fuel in the combustion chamber. The fuel may be received from the independent variable fuel input 103 as a flow of fuel received from an external fuel generation device. The flow rate for the independent variable fuel input 103 is controlled outside of the engine 102. The independent variable fuel input 103 may be a gaseous emission from an external fuel generation device. The external fuel generation device controls the flow of the independent variable fuel input 103. The quantity of fuel provided to the engine 102 is set by the operation of the external fuel generation device. All fuel provided by the external fuel generation device may be provided to the engine 102. The engine 102 may be required to combust all the fuel supplied by the fuel generation device in a timely fashion to prevent accumulation of fuel or pressure variations in the fuel supply.

The engine 102 may supply mechanical energy or a rotational force to the mechanical load device 105. The engine 102 is configured to provide a fixed output torque (first torque) generated by combustion of fuel from the independent variable fuel input 103, which is a fixed fuel source. The fixed fuel source is independent of the engine and set external to the engine by the independent variable fuel input 103. The mechanical load device 105, driven by the engine 102 may be configured to require a load torque (second torque) defined by the independent flow output device 107. The mechanical load device 105 may be configured to require an operational speed, defined by the independent flow output device 107 or another factor, such as the fuel generation device providing the independent variable flow input 103.

The controller 100 may be configured to provide instructions to the motor-generator 101. The controller may directly affect the power flow into or out of the motor-generator 101. The controller 100 may be configured to provide instructions to the engine 102. The controller may directly control the throttle or other control elements of the engine 102. Alternatively, an engine control unit (ECU) 104 may provide instructions to the engine 102 or other functions described herein involving the controller 100 and the engine 102.

The controller 100 may be configured to compare the output torque and the load torque to provide a control signal. In some instances, the control signal is a motor control signal (first control signal) that instructs the motor-generator 101 to provide power to the engine 102 when the second torque exceeds the first torque. In some instances, the control signal is a generator control signal (second control signal) to the motor-generator 101 to draw power from the engine 102 when the first torque exceeds the second torque. Both the motor control signal and the generator control signal may be variable within the capabilities of the motor generator 101. The motor control signal and generator control signal may also be considered as a single torque target signal, having a positive and negative component. The negative component may be chosen to be a motor control signal and the positive component may be chosen to be the generator control signal. Other definitions are possible.

The controller 100 is configured to determine a setting for a throttle for the engine 102 in response to the fuel flow of the independent variable fuel input 103. The controller 100 may receive data from a sensor that is indicative of the fuel flow of the independent variable fuel input 103. The sensor may be a flow rate sensor configured to measure the flow rate of the independent variable fuel input 103. The sensor may be a mass airflow sensor. The flow rate sensor may be included in the independent variable fuel input 103 or in a conduit between the independent variable fuel input 103 and the engine 102. The flow rate sensor may be mounted in the manifold of the engine 102.

The fuel flow rate may be computed based on differential pressures between the inlet fuel pressure and an expected target. The fuel flow rate may also be established by measuring a flow of a secondary characteristic, such as the flow rate of a different fuel into the independent variable flow input 103 or computed based on other measured characteristics of the independent variable flow input, such as temperatures, operating efficiencies, secondary power output, or other such parameters.

The fuel flow rate may also be a parameter, controlled by the airflow through the engine and a fuel-air mixing mechanism within the engine 102. The fuel flow rate may be controlled by a fuel injection device within the engine 102 but matched to the air flow through the engine by referencing a target air fuel ratio. The engine 102 may be configured to operate as a lean-burn engine, combusting the fuel in an excess of air. The fuel flow rate may be controlled within a range without adjustment to the airflow through the engine via the throttle plate.

The air flow rate into the engine may be referenced to the fuel flow rate by an oxygen sensor that detect the amount of oxygen in the exhaust manifold of the engine 102. The sensor may be an air fuel sensor, for example FIG. 3 illustrates an example air fuel (AF) sensor 106. The AF sensor 106, or AF ratio sensor, may detect the ratio of air to fuel in the manifold of the engine 102. The AF sensor 106 may include an oxygen sensor along with circuitry that analyzes the oxygen content to determine the AF ratio of the manifold of the engine 102. The air fuel ratio or oxygen content of the exhaust gas may be a control variable, dictated by requirements of a fuel generation device providing the independent variable flow input 103.

The controller 100 may calculate the throttle setting in response to data collected by the sensor. The controller 100 may compare the sensor data to a threshold value. In one example, there is a feedback loop so that the throttle is increased when the sensor data is below the threshold and/or the throttle is decreased when the sensor data is above the threshold. For example, when the sensor is the AF sensor 106 or an oxygen sensor, higher levels of oxygen indicate that less oxygen is needed to burn all of the fuel, and lower levels of oxygen indicate that more oxygen is needed to burn all of the fuel.

The controller may calculate a throttle setting in response to a fuel flow target, determined by measurement of an input fuel pressure relative to a target or another pressure, such as that at the output of the independent variable flow output device 107. The throttle setting may be determined by comparing the pressure or difference in pressures to a target, a range or a setpoint derived from a lookup table, equation or another source.

In alternative to the feedback loop for iteratively opening and closing the throttle valve, the controller 100 may analyze the sensor data to determine the setting for the throttle. For example, a level in the sensor data corresponds to a particular throttle setting. The controller 100 may include a lookup table that associates sensor levels with throttle settings.

The controller 100 is configured to operate the motor-generator 101 in response to the setting for the throttle. In some instances, the motor-generator 101 may operate as a generator, providing electrical energy to the energy sink 111. In some instances, the motor-generator 101 may operate as a motor, converting electrical energy from the energy source 110 to mechanical energy provided to the engine 102.

In one alternative, the controller 100 may control the air flow to the engine through another device such as a wastegate of a turbocharger instead of the throttle. The controller 100 may control the air flow through the engine by adjusting the pressure in the intake manifold of the engine by adjusting the flow rate of exhaust gas through the turbine of the turbocharger, adjusting the speed of the turbocharger and therefore the pressure in the intake manifold. Adjusting the pressure in the manifold will change the air charge density, affecting the mass air flow rate through the engine. Increasing the exhaust gas flow through the turbocharger may increase pressure in the intake manifold of the engine, which may increase the density of the charge air and therefore increase the mass flow through the engine at a given volumetric flow rate, determined by the size and speed of the engine.

In another alternative, the controller 100 may control the air flow through the engine by adjusting the timing of one or more valves controlling the flow into the cylinder of the engine. Delayed closing of an intake valve may reduce the charge retained in the cylinder because the intake port will allow some of the intake charge to return to the intake manifold as the piston travels upward. Delaying the opening of the intake valve along with delaying the closing of an exhaust valve may also reduce the volumetric flow rate through the engine by allowing some of the combustion byproducts of the previous cylinder cycle to remain in the combustion chamber, providing less volume for new intake charge to fill during the intake stroke.

Adjusting the valve timing can have a significant effect on the airflow through the engine, while reducing the number of control variables in the system and providing the potential to reduce pumping losses due to the throttle plate by controlling airflow without a throttle. While this configuration may increase engine complexity, the reduction in pumping losses may warrant such complexity in cases where efficiency is considered important.

Figure 4:
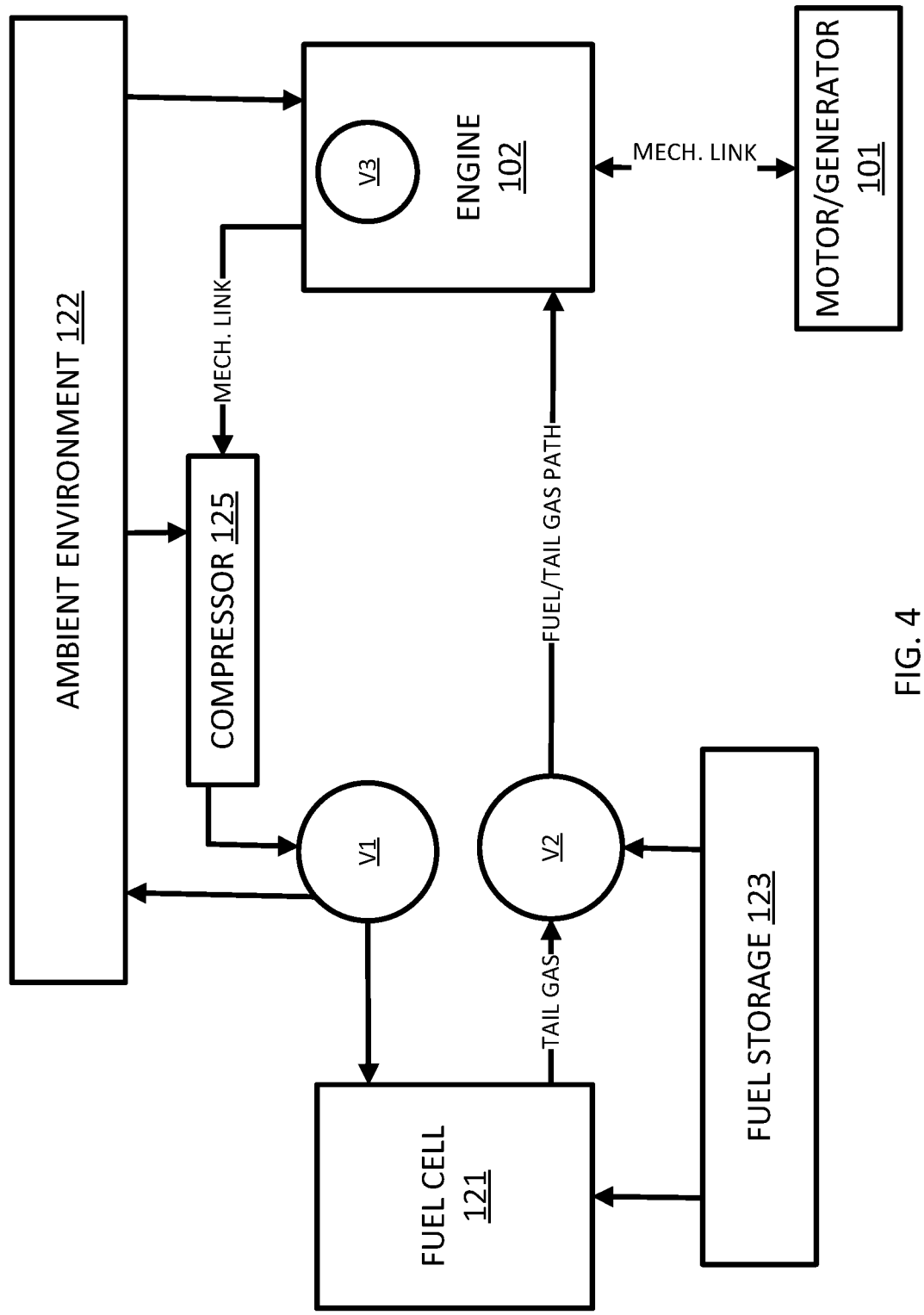
FIG. 4 illustrates an example system including a fuel cell and flows for the fixed fuel source engine.
Figure 5:
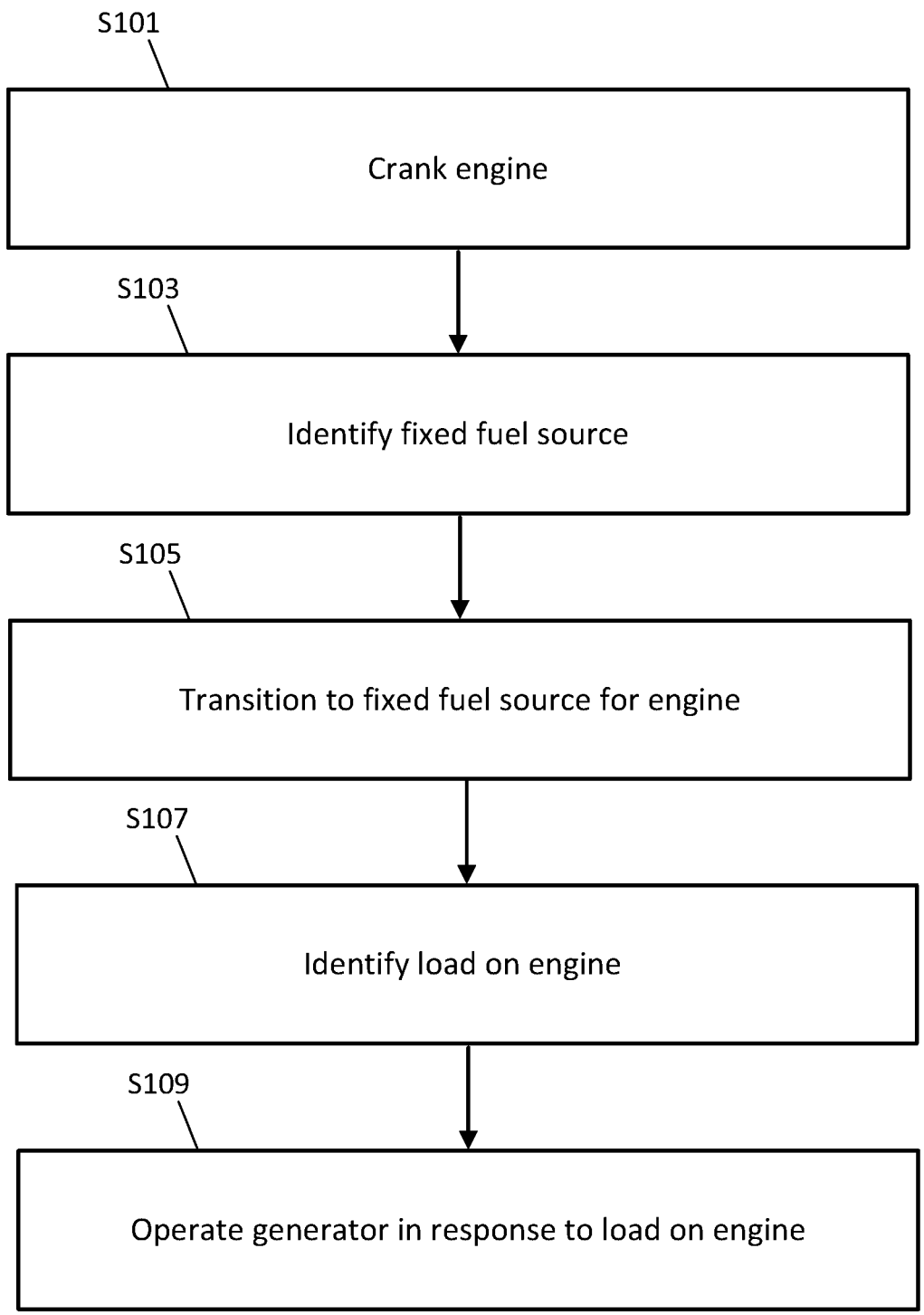
FIG. 5 illustrates an example flow chart for the operation of the system of FIG. 4.

FIG. 4 illustrates an example where the independent variable flow fuel input 103 is anode tail gas provided by a fuel generation device which is a fuel cell. As described herein, the engine 102 receives fuel from a fixed fuel source (e.g., fuel cell 121) and the motor-generator 101 supplements the operation of the engine 102. A fuel source 123 provides fuel to the fuel cell 121 and to the engine 102 at various times. The fuel source 123 may be integrated with the engine 102. A compressor 125 is driven by the engine 102 to convert mechanical energy to pressurized air to be provided to the cathode of the fuel cell 121. The example of FIG. 4 includes three valves. A first valve V1 provides compressed ambient air in the gas provided to the cathode of the fuel cell. A second valve V2 regulates the mixing of fuel and tail gas from the anode of the fuel cell 121 to the fuel input of the engine 102. A third valve V3 is the throttle of the engine 102 to regulate air flow through the engine. Additional, different, or fewer components may be included. FIG. 5 illustrates an example flow chart for the operation of the system of FIG. 4.

In act S101, the engine 102 is cranked. The engine may be cranked (e.g., initially rotated from a stopped position) from an ignition signal generated from a user input (e.g., pushed button or turned key) or from the controller 100. The operational torque to rotate the engine may be supplied by the motor-generator 101 or by a starter motor on the engine. The energy to crank the engine may be supplied by a battery, the fuel cell 121, or by the power grid or utility. The controller 100 may generate the start signal in response to feedback information from the fixed fuel source (e.g., the independent variable flow input 103) or from a sensor thereof, or from the mechanical load (e.g., independent flow output device 107) or from a senor thereof. The controller 100 may generate the start signal in response to a predetermined scheduled (e.g., predetermined time of day, day of week, or according to a calendar).

The engine 102 may initially operate from fuel provided by the fuel storage 123. The second valve V2 may control the flow of fuel to the engine 102, which may include providing a path through the second valve V2 between the fuel storage 123 to the engine 102. The fuel may be a gaseous fuel such as liquefied petroleum gas (LPG), hydrogen gas, natural gas, or another gas. The LPG may be or include primarily butane, primarily propane, or a mixture of hydrocarbon gases. The hydrogen gas may include hydrogen mixed with air or oxygen. The hydrogen gas may be mixed with another fuel when delivered to the engine. Natural gas (e.g., compressed natural gas (CNG)) may be a hydrocarbon gas mixture.

In act S103, a fixed fuel source is identified. Identification of the fixed fuel source may involve that the fixed fuel source is connected to the system and provides a flow of fuel that cannot be controlled by the controller 100. The controller 100 may receive an identification signal triggered by the connection of the engine 102 to the fuel cell 121. The system may operate in a mode where the fuel source is not fixed, such as when operating on fuel from the fuel storage 123, when the identification signal is not active. The identification signal may include the estimated flow rate of the fuel cell 121 and the type or quality of fuel provided by the fuel cell 121. The identification of the fixed fuel source may be made by virtue of the physical connection of the engine 102 fuel input to the anode tail gas of the fuel cell 121. The identification of the fixed fuel source may be made in response to the second valve V2 being switched to connect the fuel cell 121 to the engine 102.

In act S105, the engine 102 transitions to the fixed fuel source from the initial fuel source. The combustion chamber of the engine 102 may be connected to an exhaust port. According to a combustion cycle for the piston, the exhaust port is connected and disconnected from the combustion chamber by the piston to release exhaust gas through the exhaust port. The control valve V2 may provide fuel to the engine 102 from fuel storage 123 for a time period until the fuel flow is received from the fuel cell 121. The time period may be set based on characteristics of the fuel cell 121. For example, different types of fuel cells or different sizes of fuel cells may respond within different timeframes.

The temperature of the fuel cell 121 may reach the activation temperature for ion mobility in the membrane of the fuel cell 121, e.g. 500° C. or 600° C. The activation temperature may vary based on the operating pressure of the fuel cell and the constructing material of the membrane. The amount of heat applied affect the rate at which the fuel cell reaches the activation temperature. The flow rate of the anode tail gas from the fuel cell may depend partly on the temperature of the fuel cell membrane. The flow rate of anode tail gas from the fuel cell may also depend on the power produced by the fuel cell 121. The flow rate of the anode tail gas from the fuel cell 121 may also depend on the flow rate and gas mixture provided to the cathode of the fuel cell 121.

Figure 6:
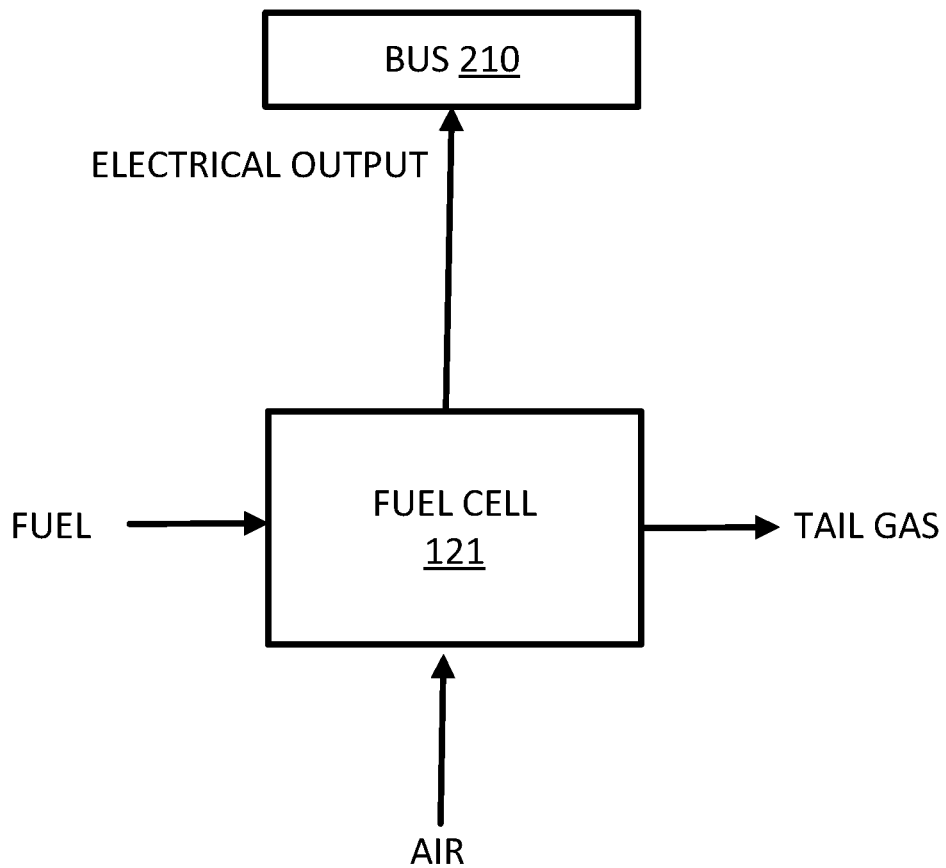
FIG. 6 illustrates the fuel cell of FIG. 4.

FIG. 6 illustrates an example fuel cell 121. The fuel cell 121 is an electrochemical device to convert chemical energy from a fuel into an electrical output through an electrochemical reaction of a fuel, such as hydrogen or methane with oxygen or another oxidizing agent. The tail gas flow rate varies with a variety of factors such as age of the fuel cell, operating temperature of the fuel cell, output power of the fuel cell, operating pressure of the fuel cell, fuel composition, air composition, catalytic reforming efficiency and other similar factors. The tail gas is consumed by the engine 102 independent of a load on the engine 102 from the mechanical load device.

The electrical output may be power provided to a utility, another electrical grid, or one or more batteries. In one example, the electrical output of the fuel cell 121 is provided to a bus 210, which may be connected to the utility, another electrical grid, a battery bank, as well as the motor-generator 101. The fuel cell 121 is also connected to a fuel source (e.g., fuel storage 123) for providing the chemical energy to the electrochemical reaction. The fuel cell 121 also produces tail gas, which still contains stored chemical energy and may be considered a pollutant. The tail gas is combusted by the engine 102 to extract the chemical energy and to reduce the pollution factor of the output gas. The amount of tail gas, or the concentration of combustible material in the tail gas, may fluctuate according to the load on the fuel cell 121. For example, when the fuel cell 121 is connected to a battery bank, the fuel cell 121 emits more tail gas when the battery bank is charging than when the battery bank is fully charged. When the fuel cell 121 is connected to the utility, the fuel cell 121 emits more tail gas when the utility is drawing power from the fuel cell 121 than when the utility is not drawing power. The power provided to the utility may be controlled by controller 100 or by another controller.

The pipe or conduit may include the first valve V1 to regulate the flows of ambient air or compressed air. The conduit may include multiple portions or lengths of pipe that are connected to the first valve V1, which is an ambient valve configured to selectively control the flow of ambient air or compressed air to the fuel cell 121. A fuel cell portion extends from the fuel cell 121 to the first valve V1. A compressor portion extends from the compressor 125 to the first valve V1. The tail gas path from the fuel cell 121 to the engine 102 through the fuel cell portion and the engine portion provides a flow of tail gas from the fuel cell 121 to the engine 102.

The first valve V1 may be controlled by the controller 100 according to sensor data. One example sensor may include a temperature sensor at the fuel cell 121. The controller 100 may control the first valve V1 to open the path between the compressor portion and fuel cell portion when the temperature is below a threshold and close the path between the compressor portion and the fuel cell portion when the temperature is above the threshold.

Transitioning to the fixed fuel source may include switching the fuel source for the engine 102 from the fuel storage 123 to the tail gas from the fuel cell 121. The second valve V2 regulates a flow through a fuel pipe or conduit that has at least three paths. A fuel tank portion extends from the fuel storage to the second valve V2. An engine portion extends from the second valve V2 to the engine 102. A fuel cell portion extends from the fuel cell 121 to the second valve V2. A fuel path through the fuel cell portion and the engine portion provides a flow of fuel from the fixed fuel source to the engine.

The second valve V2 may be controlled by the controller 100 according to various received data to open the path from the fuel storage 123 to the engine 102 and/or open the path from the fuel cell 121 to the engine 102. One or both of the paths may be opened partially. The controller 100 may operate the second valve V2 in response to sensor data. The second valve V2 is a fuel valve configured to selectively control the flow of fuel from the fuel cell 121 to the engine 102.

In one example, a tail gas sensor at the fuel cell 121 or in the pipe detects when the fuel cell 121 is producing tail gas. The controller 100 may determine when the tail gas is sufficient for the combustion of the engine. The controller 100 may compare a fuel level (e.g., hydrocarbon level) in the tail gas sensor data to a threshold. When the sensor data exceeds the threshold, the controller 100 instructs the second valve V2 to transition the fuel source for the engine 102 from the fuel storage 123 to the tail gas of the fuel cell 121.

The throttle of the engine 102 is a third valve V3 that applies a setting for the throttle for the engine in response to the fuel flow from the fuel cell 121. The controller 100 determines a setting for a throttle for the engine in response to the fuel flow to maintain an air-fuel ratio as measured by a sensor such as an oxygen sensor or AF sensor 106 as described herein.

The engine 102 may provide a torque based on the setting of the throttle V3 and the supplied fuel type and flow rate. The engine rotational speed may increase if the torque produced exceeds the torque demand from the other rotating elements, such as the compressor, the expander, and the motor-generator. The engine rotational speed may decrease if the torque provided by the engine is lower than the torque demand from the other rotating elements, such as the compressor, the expander and the motor-generator.

In act S107, the controller 100 is configured to identify a load on the engine. The engine 102 is configured to power a mechanical load. The load on the engine may include a fixed load that applies a substantially constant load. The term substantially constant may mean within a predetermined range (e.g., within 2%, 5%, or 10% or an absolute value). The substantially constant load may also be turned on or off over time. The identification of the load may be based on a feedback signal from the load. The feedback signal may indicate whether or not the load is on or off. The feedback signal may indicate the power level of the load. The feedback signal may indicate a type of load.

The mechanical load may correspond to a load torque. The load torque may depend on the particular power drawn by the particular load. In one example, the controller 100 may determine or identify the load torque based on the feedback signal. The controller 100 may perform a comparison of the engine torque from the engine 102 for the fuel flow to the load torque required by the mechanical load. The controller 100 may determine, in response to the comparison, whether the setting for the throttle provides less than the predetermined level or the setting for the throttle exceeds the predetermined level. The controller may change the torque produced by the motor-generator in order to compensate for the measured or computed difference in torque in order to prevent changes in the rotational speed of the rotating members of the system.

The engine 102 may produce torque as required to burn all available fuel. However, the mechanical load may also require operation at a target speed for the rotating members in the system that is determined by an external factor, such as a required flow to another element in the system, a required pressure to another element in the system, or some other factor. The controller 100 may calculate, receive or determine the target speed based on the feedback signal, sent from another controller, an external system element, or a signal from the mechanical load. The target speed may depend on whether or not the mechanical load is operating or not operating. The target speed may depend on operating or environmental parameters of the mechanical load or subsystems supplied by it.

The mechanical load device may be an independent flow output device that requires a fixed amount of power or fixed target speed from the engine 102. The mechanical load device may include an air compressor 125, as shown in FIG. 4. The compressor 125 may provide air pressure to an external device such as a pneumatic drill or wrench. The compressor 125 may provide air pressure to the fuel cell 121 through the valve V1. The valve V1 may provide a path from the compressor 125 to the fuel cell 121 sufficient for operation of the fuel cell 121 and may bleed excess air pressure to the ambient environment 122. The compressor 125 may be a scroll compressor including a pump or a vacuum pump.

The compressor 125 may directly provide air pressure to the external device or the fuel cell 121. The system may omit an air tank or air compressor storage device. The omission of the tank means that the engine 102 speed or torque must be controlled to match a requirement of the supplied device.

In act S109, the controller 100 operates the motor-generator 101 in response to the load on the engine, or in response to the identification of the load. Alternatively, the controller 100 may operate the motor-generator 101 in response to the setting for the throttle and a power requirement of the mechanical load. As yet another alternative, the controller 100 may operate the motor generator based only on a target speed and feedback from the actual output speed of the engine. The controller 100 may determine whether the setting for the throttle provides the power requirement the mechanical load. The controller 100 may compare the speed of the engine 102 to the target speed. The controller 100 may compare the torque provided by the engine 102 to the torque required by the mechanical load.

The controller 100 may generate a generator command in response to the comparison. When the setting for the throttle, or speed of the engine 102, provides less than the power requirement of the mechanical load, the controller 100 may instruct the motor-generator 101 to operate as a motor. The motor-generator 101 converts electrical stored energy from the batteries to mechanical energy that is applied to the engine 102. When the setting for the throttle, or the speed of the engine 102, exceeds the power requirement, the controller 100 may instruct the motor-generator 101 to operate as a generator. The motor-generator 101 may receive mechanical energy from the engine 102 and convert the mechanical energy to electrical energy that is provided to a bus (e.g., utility or battery bank). The controller 100 may include instructions in the generator command to set the field current for the generator or a different field current for the motor.

When the setting for the throttle, or the speed of the engine 102, is within a range of the power requirement for the load, the controller 100 generates a neutral command for the motor-generator 101 to operate neither as a motor or a generator. The neutral command may cause the motor-generator 101 to be decoupled from the engine 102 or may turn off the field current to minimize losses.

Alternatively, the controller 100 may generate a generator command in response to a torque comparison. The controller 100 may compare the torque of the engine and the torque required by the mechanical load. The controller 100 may provide a first control signal to the motor to provide power to the engine when the second torque exceeds the first torque. The controller 100 may provide a second control signal to the generator to draw power from the engine when the first torque exceeds the second torque.

Figure 7:
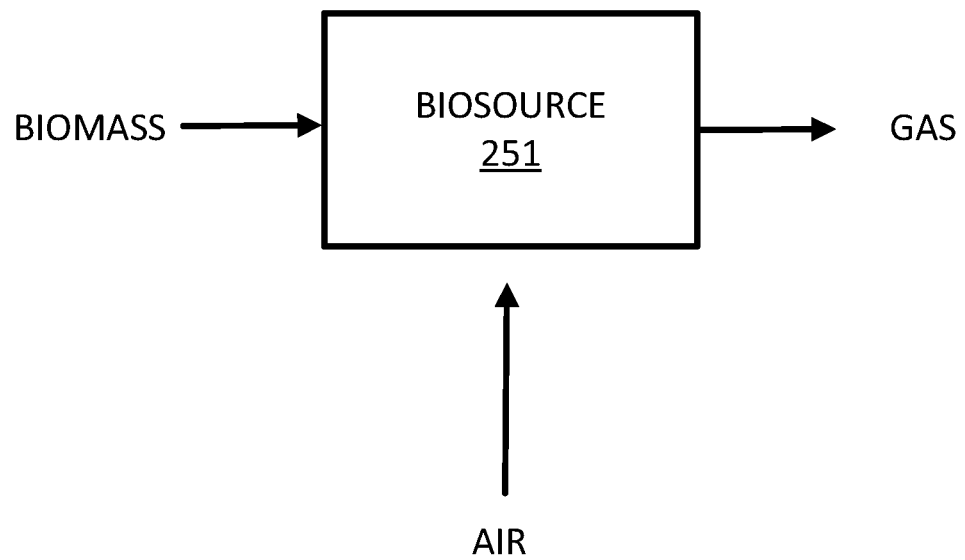
FIG. 7 illustrates another example fuel source.

FIG. 7 illustrates another embodiment of the fixed fuel source as BioSource 251. The biosource 251 may perform a chemical reaction on biomass and air to produce a gas that is provided to the engine 102. The biosource 251 may include an anaerobic bacterial that processes the biomass. The biosource 251 may be a component of a landfill, sewage facility, farm, or water treatment facility. The biosource 251 may process animal wastes. The biosource 251 may include a digester that stores the animal wastes and/or other organic material. The biosource 251 may include a biogas reactor that produces a digested slurry and emits a waste gas.

Figure 8:
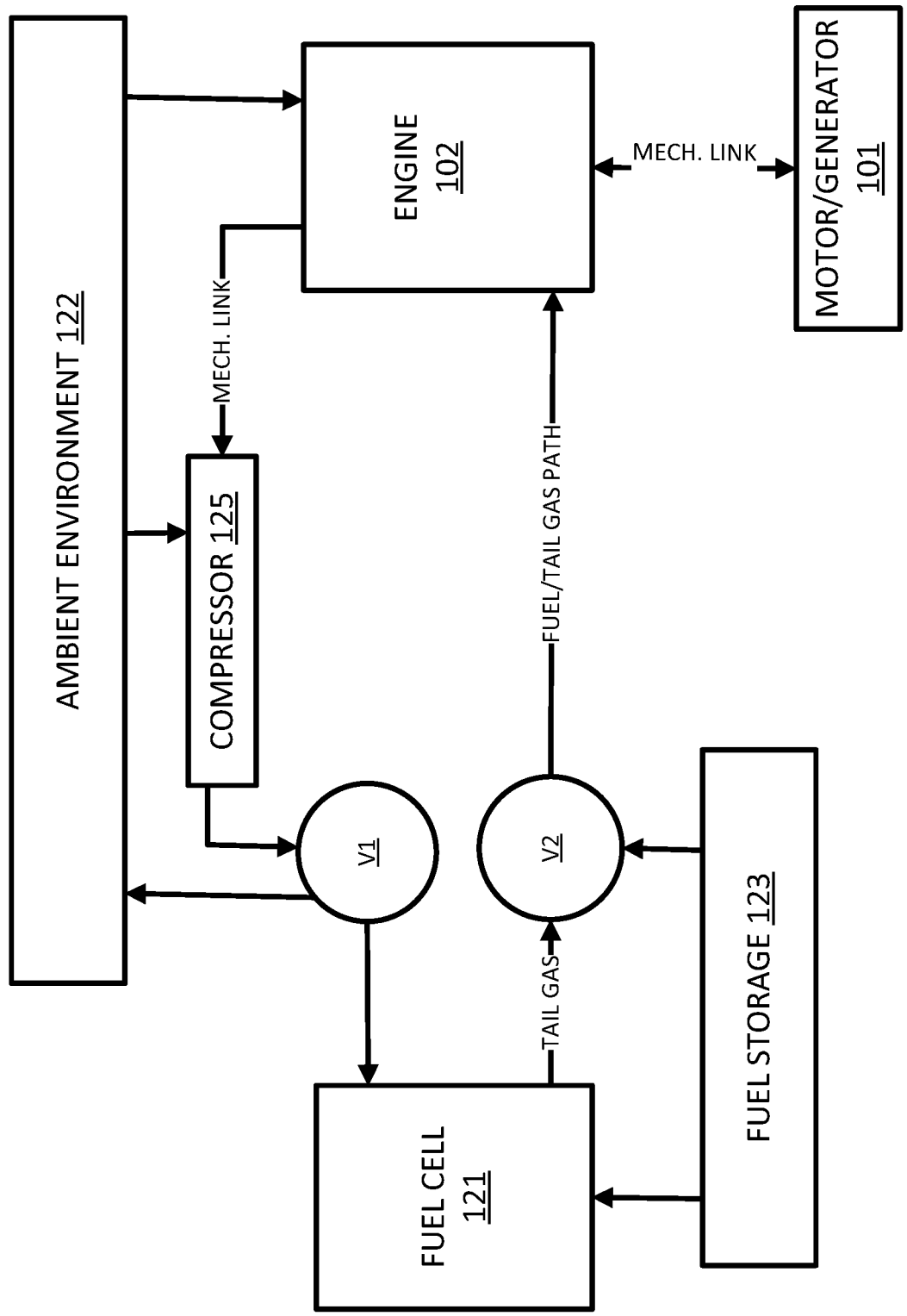
FIG. 8 illustrates another embodiment for the control system for a fixed fuel source engine supplemented by a generator.

FIG. 8 illustrates another embodiment for the control system for a fixed fuel source engine supplemented by a generator. The system of FIG. 8 omits a throttle. Rather than controlling the throttle, the engine 102 may control the air flow to the intake by the control of the speed of the engine 102 itself. The engine displaces a fixed volume in a full cycle at a known intake manifold pressure, so the engine air flow rate may be controlled by adjusting the speed of the engine. This technique adds the advantage of improved efficiency from removing the throttle, but may add additional complexity to the system, depending on the speed range allowable by the mechanical load.

In the example system of FIG. 8, it may be necessary to include additional controls to maintain a target airflow from the compressor 125 while burning all the anode tail gas from the fuel cell. The engine speed may be controlled by applying positive or negative torque with the motor-generator, but the engine speed may be too low to provide sufficient airflow in some conditions. In other conditions, the increased demand for air from the fuel cell 121 may correspond to an increase in fuel output, allowing the engine 102 to turn the compressor 125 faster and supply more air.

The engine 102 may operate under varying air-fuel ratios, such as a lean burn engine. In this case, a range of fuel quantities may be burned at each speed of the engine 102. The engine 102 may operate at a fixed air-fuel ratio or operate with intent to control to a fixed air-fuel ratio. In this case, the range of fuel quantities that can be burned at a given engine speed.

Figure 9:
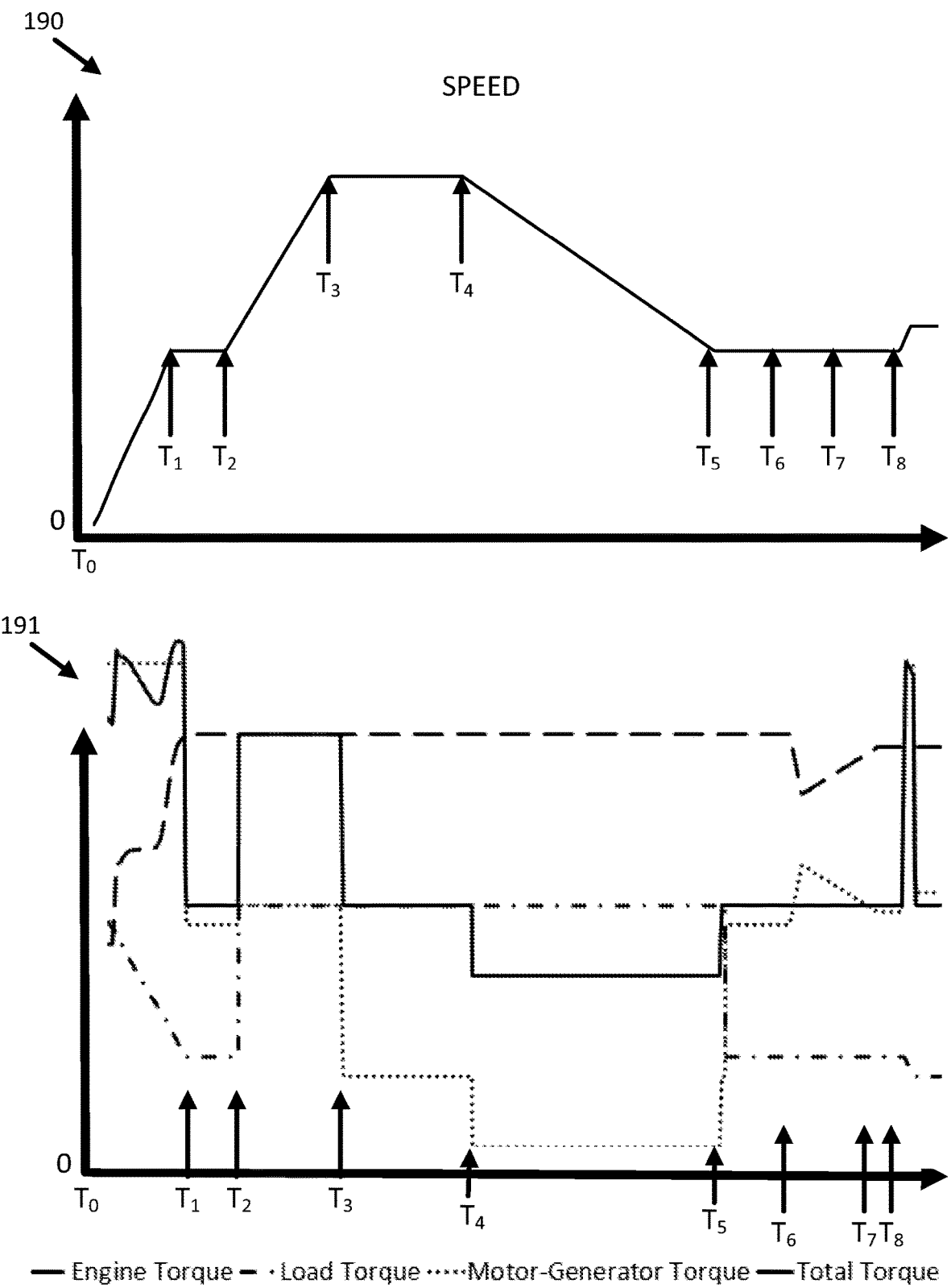
FIG. 9 illustrates an example chart for the relationship between the generator and the fixed fuel source engine.

FIG. 9 illustrates an example chart for the relationship between the generator and the fixed fuel source engine. The chart illustrates a speed plot 190 and a torque plot 191. The torque plot includes a dashed line representing the engine torque, a dotted line representing the motor-generator torque, a dashed dotted line representing the load torque, and a solid line representing the total torque.

The chart illustrates starting sequence for the engine 102. At time T0, the motor-generator provides a torque to the rotating assembly including the engine 102 crankshaft, the motor-generator 101 and the mechanical load. This torque accelerates the rotating assembly to a first speed at time T1.

At time T1, the engine 102 is effectively combusting fuel and providing output torque, which allows the motor-generator 101 torque to decrease while the speed to the mechanical load is maintained. At time T2, the engine 102 enters a maximum power state where it produces at much power as possible. The motor-generator reduces load to allow the engine to accelerate to produce maximum power by running as fast as possible. Once the engine 102 reached maximum speed at time T3, excess power is exported through the motor-generator.

During the maximum power operational state or prior to the speed increase to enter the maximum power state, the engine and motor-generator may be decoupled from the mechanical load or the mechanical load may be placed in a bypass state due to high speed operation, such as shown in the example. Some mechanical loads will accept higher speed inputs or may actually demand higher speed operation under certain circumstances. One example of the maximum power state is a warmup state, the temperature of the membrane in the fuel cell 125 increases until it reaches an operating point.

At time T4, the engine speed is reduced by increasing the torque drawn from the system by the motor-generator, illustrated as a negative torque, in order to provide the desired speed to the mechanical load, reducing the power generated by the system due to the decrease in speed. The mechanical load is re-applied at time T5.

At time T6, the engine torque decreases because it is now drawing fuel from a fixed fuel source. The mechanical load remains high, so the motor-generator provides some torque. At time T7, the engine torque has increased above the mechanical draw as the fixed fuel source increases output, so the motor-generator begins extracting power (negative torque) in order to maintain speed to the mechanical load. At time T8, the speed target required by the mechanical load increases, causing the motor generator to adjust output torque to reach the new target speed.

Figure 10:
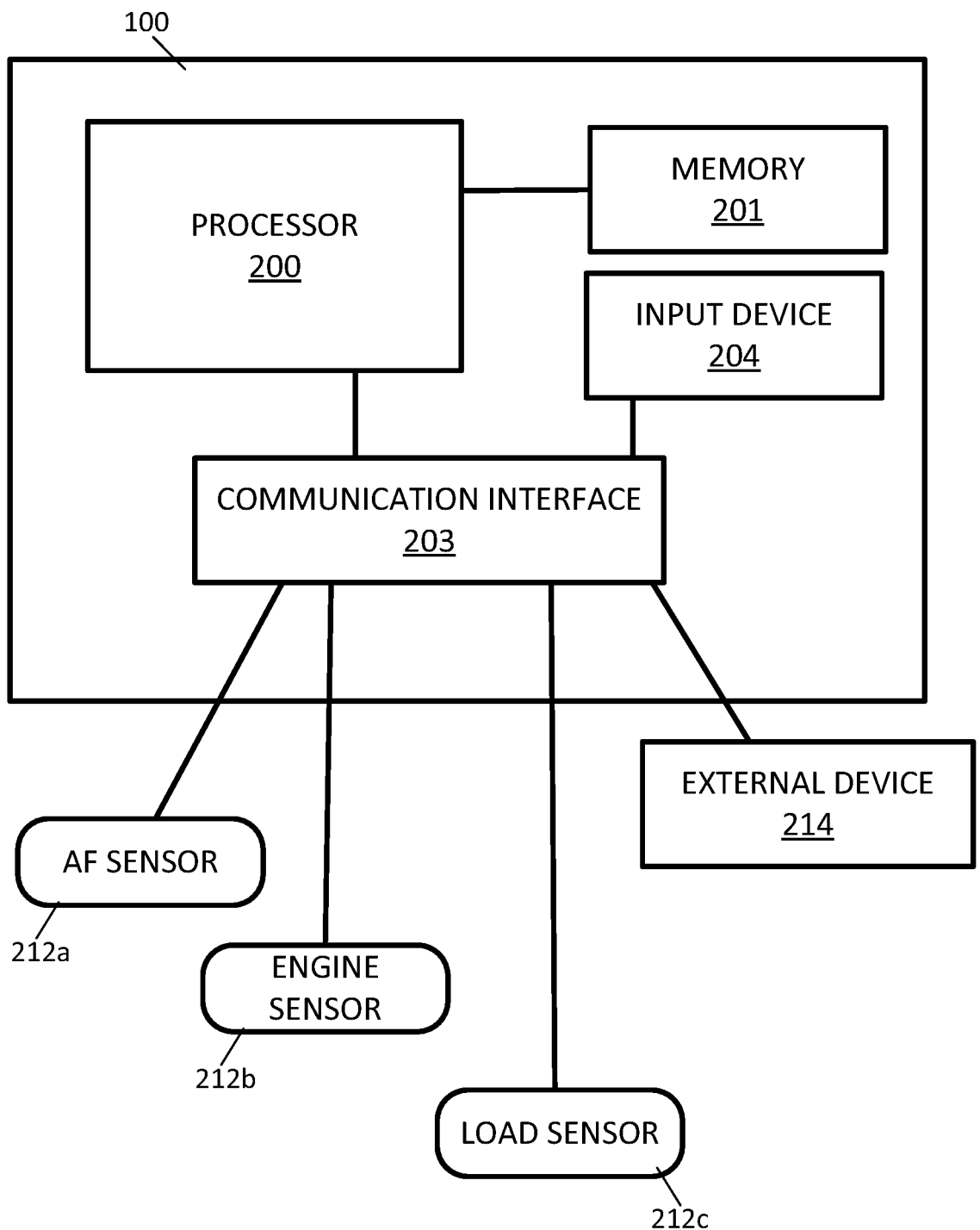
FIG. 10 illustrates an example controller for the control system for the fixed fuel source engine supplemented by the generator.

FIG. 10 illustrates an example controller for the control system for the fixed fuel source engine supplemented by the motor-generator including controller 100. The control system provides or draws power from an engine using a motor-generator, when the engine has at least one independently controlled constraints that restrict the responsiveness of the engine to the load. One of the independently controlled constraints may be a supplied flow rate of a fixed fuel source. One of the independently controlled constraints may be a throttle of the engine. The throttle may move in response to the fuel source to burn all the fuel provided to the engine. One of the independent controlled constraints may be a speed target from a load.

Figure 11:
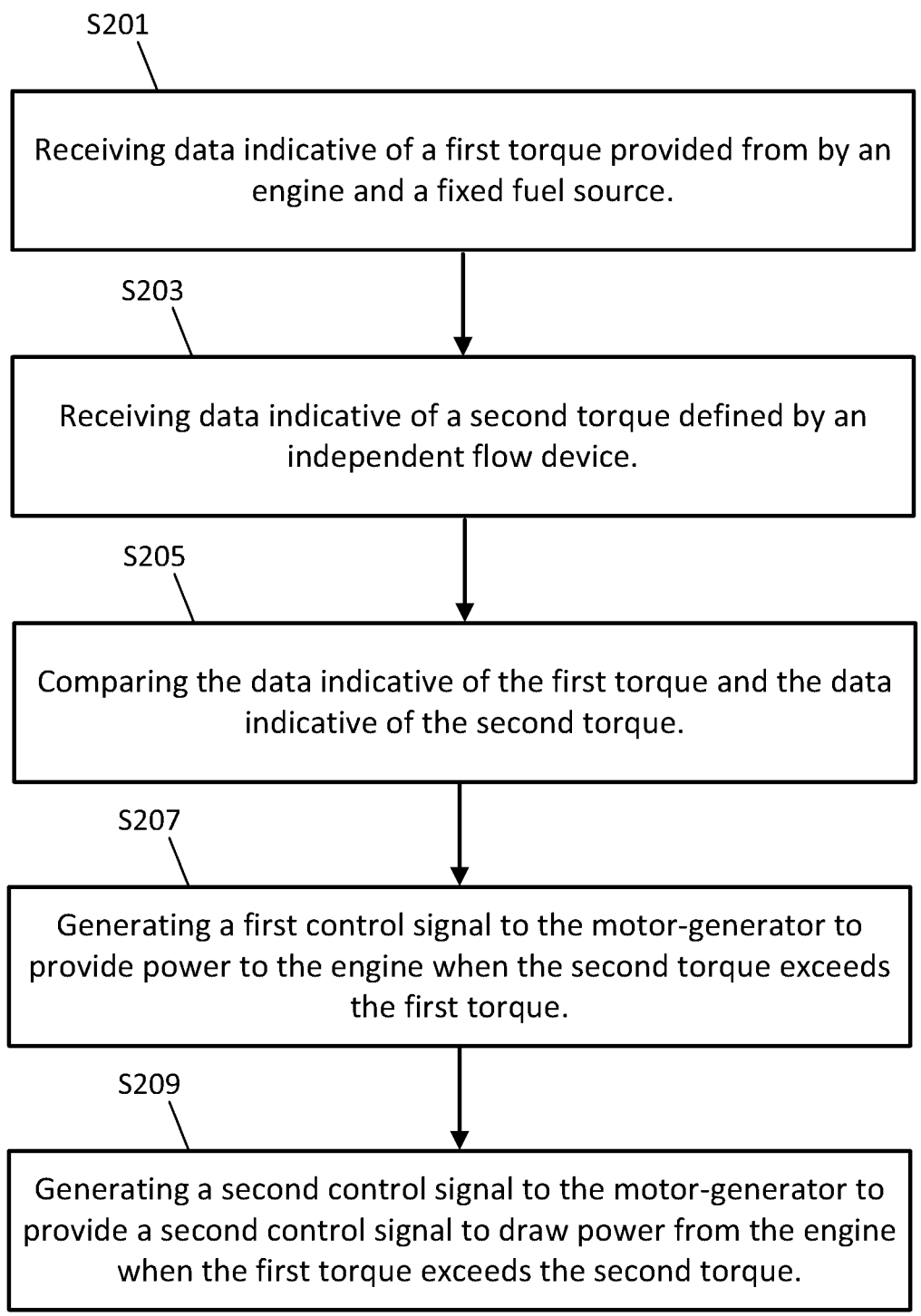
FIG. 11 illustrates a flow chart for the controller of FIG. 10.

The controller 100 may include a processor 200, a memory 201, an input device 204, and a communication interface 203. The communication interface 203 may communicate with one or more sensors such as AF sensor 212a, engine sensor 212b, and load sensor 21c, an external device 214, the input device 204, an inner coil control device 216, and an outer coil control device 218. Additional, different, or fewer components may be included. FIG. 11 illustrates an example flowchart for operation of the controller of FIG. 10 for controlling the fixed fuel source engine supplemented by the generator. Additional, different, or fewer acts may be included.

At act S201, the processor 200 or the communication interface 203 receives data indicative of a first torque provided from by an engine and a fixed fuel source. The data indicative of the first torque may be derived from sensor data from the AF sensor 212*a*, the engine sensor 212*b*, or any combination thereof. The data indicative of the first torque may be derived from sensor data from the independent variable fuel input such as a flow rate sensor configured to measure the flow rate of the independent variable fuel input. The fixed fuel source is independent of the engine and set external to the engine. The communication interface 203 is an example means for receiving the data of the first torque.

At act S203, the processor 200 or the communication interface 203 receives data indicative of a second torque defined by an independent flow device. The data indicative of the second torque may be derived from sensor data from a load sensor or feedback from the load. The communication interface 203 is an example means for receiving the data of the second torque.

At act S205, the controller 100 is configured to compare the data indicative of the first torque and the data indicative of the second torque. The comparison may compare torque values, signal values, or another number that represents the torque provided by the engine to the torque required by the load. The controller 100 may include a comparator or analog circuit for the comparison. The processor 200 may include a module or may be apportioned to include an application specific controller or integrated circuit as a means for comparing the data indicative of the first torque and the data indicative of the second torque.

At act S207, the controller 100 is configured to generate a first control signal to the motor-generator to provide power to the engine when the second torque exceeds the first torque. The first control signal may be an instruction to the motor-generator to operate as a motor. Electrical power is drawn by the motor-generator from an electrical storage. The first control signal may be a field current, or set a field current, that controls the amount of a magnetic field generated in the motor-generator to induce an output torque that is provided to the engine. The processor 200 may include a module or may be apportioned to include an application specific controller or integrated circuit as a means for generating a first control signal to the motor-generator to provide power to the engine when the second torque exceeds the first torque.

At act S209, the controller 100 is configured to generate a second control signal to the motor-generator to provide a second control signal to draw power from the engine when the first torque exceeds the second torque. The first control signal may be an instruction to the motor-generator to operate as a generator. Torque is provided to the motor-generator from the engine. The first control signal may be a field current, or set a field current, that controls the amount of a magnetic field generated in the motor-generator to induce an output electrical signal that is provided to the electrical storage, or another device. The processor 200 may include a module or may be apportioned to include an application specific controller or integrated circuit as a means for generating a second control signal to the motor-generator to provide a second control signal to draw power from the engine when the first torque exceeds the second torque.

The external device 214 may be the load device such as a pump, compressor, fan, propeller, drive wheel, or other variable-speed devices. The output device 214 the electrical storage device such as a battery, fuel cell, power grid, or another device.

An output or display for the controller 100 may display an indication of the operation of the controller 100 such as whether the engine generator is operating as a generator or a motor, the first and second torque values, or other parameters or settings. The output or display may include a screen, one or more lights, or one or more light emitting diodes (LEDs).

The memory 201 may include a lookup table that associated various types of loads with target speeds. The memory 201 may include a lookup table that associated throttle settings with torque levels. The memory 201 may include a lookup table that associates any of the sensor readings with torque values. The memory 201 may be a volatile memory or a non-volatile memory. The memory 201 may include one or more of a read only memory (ROM), random access memory (RAM), a flash memory, an electronic erasable program read only memory (EEPROM), or other type of memory. The memory 201 may be removable from the network device, such as a secure digital (SD) memory card.

The processor 200 may include a general processor, digital signal processor, an application specific integrated circuit (ASIC), field programmable gate array (FPGA), analog circuit, digital circuit, combinations thereof, or other now known or later developed processor. The processor 200 may be a single device or combinations of devices, such as associated with a network, distributed processing, or cloud computing.

In addition to ingress ports and egress ports, the communication interface 303 may include any operable connection. An operable connection may be one in which signals, physical communications, and/or logical communications may be sent and/or received. An operable connection may include a physical interface, an electrical interface, and/or a data interface.

The communication interface 203 may be connected to a network. The network may include wired networks (e.g., Ethernet), wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

The input device 204 may include a button, a switch, a key pad, a touchscreen, or other structure configured to allow a user to enter data such as throttle settings, sensor types, load types, or other configurations. The input device 204 may include a connection to a network, a smartphone, a tablet, a personal computer configured to electronically transmit the trigger command to the control system. The communication may be wireless or wired (e.g., received by the communication interface 203).

While the computer-readable medium (e.g., memory 201) is shown to be a single medium, the term "computer-readable medium" includes a single medium or multiple media, such as a centralized or distributed database, and/or associated caches and servers that store one or more sets of instructions. The term "computer-readable medium" shall also include any medium that can store, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. The computer-readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Processors suitable for the execution of a computer program include, by way of example, both general and special purpose microprocessors, and anyone or more processors of any kind of digital computer. Generally, a processor may receive instructions and data from a read only memory or a random access memory or both. The essential elements of a computer are a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A system for supplementing a fixed fuel source for an engine with a motor-generator, the system comprising:
   a motor-generator including a motor and a generator;
   an engine configured to provide a first torque from a fixed fuel source, wherein the fixed fuel source is independent of the engine and set by a gaseous emission that is external to the engine;
   a mechanical load device driven by the engine and configured to require a second torque defined by a fixed speed or a fixed power output; and
   a controller configured to compare the first torque and the second torque, provide a first control signal to the motor to provide power to the engine when the second torque exceeds the first torque and provide a second control signal to the generator to draw power from the engine when the first torque exceeds the second torque.

2. The system of claim 1, wherein the fixed fuel source varies over time and is consumed by the engine independent of a load on the engine from the mechanical load device.

3. The system of claim 1, wherein the fixed fuel source is a fuel cell, a digester, or a biogas source.

4. The system of claim 1, wherein the mechanical load device is a compressor coupled to the fixed fuel source.

5. The system of claim 1, further comprising:
an air valve configured to selectively control a flow of ambient air to the fixed fuel source.

6. The system of claim 1, further comprising:
a fuel path from the fixed fuel source to the engine to provide a flow of fuel from the fixed fuel source to the engine; and
a fuel valve configured to selectively control the flow of fuel from the fixed fuel source to the engine.

7. The system of claim 6, further comprising:
a first valve configured to selectively control a flow of ambient air to the fixed fuel source;
a tail gas path from the fixed fuel source to the engine to provide a flow of tail gas from the fixed fuel source to the engine; and
a second valve configured to selectively control the flow of tail gas from the fixed fuel source to the engine.

8. The system of claim 7, further comprising:
a third valve as a throttle of the engine to apply a setting for the throttle for the engine in response to the flow of fuel.

9. A method for supplementing a fixed fuel source for an engine with a motor-generator a motor and a generator, the method comprising:
providing, from the engine, a first torque from a fixed fuel source, wherein the fixed fuel source is independent of the engine and set by a gaseous emission that is external to the engine;
identifying a second torque required by a mechanical load device and defined by a fixed speed or a fixed power output;
comparing the first torque and the second torque;
providing a first control signal to the motor to provide power to the engine when the second torque exceeds the first torque; and
providing a second control signal to the generator to draw power from the engine when the first torque exceeds the second torque.

* * * * *